Patented June 24, 1924.

1,499,080

UNITED STATES PATENT OFFICE.

JEFFREY R. SHORT, OF LA GRANGE, AND MONTAGUE F. HUNT, OF CHICAGO, ILLINOIS, ASSIGNORS TO ANDREWS MILLING COMPANY, A CORPORATION OF ILLINOIS.

DUSTING FLOUR.

No Drawing. Application filed May 8, 1922. Serial No. 559,459.

*To all whom it may concern:*

Be it known that we, JEFFREY R. SHORT and MONTAGUE F. HUNT, citizens of the United States, residing, respectively, at La Grange and Chicago, county of Cook, State of Illinois, have invented a certain new and useful Improvement in Dusting Flour, and declare the following to be a full, clear, and exact description of the same, such as will enable others skilled in the art to which it pertains to make and use the same.

In the manufacture of bakery products it is necessary that the dough or the mechanism, or both, be dusted with a dry flour at intervals during the course of the dough from the mixer to the oven. The purpose of using dusting flour is to prevent the dough from sticking to the machinery or apparatus through which the dough passes and it must therefore be capable of taking up moisture from the surface of the dough. Furthermore, the surface of the bread or other bakery product should not be rendered cloudy on account of the presence of the dusting flour. It is also desirable that the dusting flour be of such a nature that it will flow freely from the dusting boxes, so as to insure uniformity and steadiness of flow and permit the rate of flow to be nicely regulated. Another factor which must of course be considered is that of cost of material, the cost depending not only on the unit value of the particular flour employed but also on the amount which must be used to secure the desired results.

The object of the present invention is to produce a novel dusting flour which will answer all of the foregoing requirements, be of comparatively low cost per unit, and, because of special properties which it possesses, make possible the use of a smaller quantity of dusting flour as compared with wheat flour and other low absorbing materials used for dusting purposes.

In carrying out our invention, we employed the mixture of a flour made out of corn product, which is partly gelatinized. Such a flour may be made out of corn grits, steamed until wholly or partly gelatinized, rolled into flakes, and then ground into a very fine flour. A flour of this kind will run freely through the dusting devices instead of clotting, and will therefore distribute more evenly over the dough and the working surfaces of the machines. Its cost is lower than wheat flour, and due to the fact that it will show a high absorption, approximately 200%, a small quantity may be used to accomplish the object required. Moreover, it works into the dough more readily because of gelatinization, compared with which, ordinary ungelatinized corn flour would retain its gritty character and would show a cloudy appearance on the crust. This we largely eliminated by the fact that this special corn flour is partly gelatinized. To make this still more certain, we mix with it a quantity of a specially selected wheat flour. Certain grades of wheat flour will exhibit a greater degree of color in the finished product than others, and we use a flour which will aid in coloring the crust and in overcoming any tendency to cloudiness. The presence of the wheat flour also retards the flowing quality of the special corn flour, which, being very dry and granular, might flow too freely otherwise.

Wheat flour, when used alone for dusting, carries into the bread a gluten content which is only very slightly fermented, and being sticky, results frequently in streaking of the crumb and often in the accumulation of small particles of dough, whereas in our dusting flour the tendency to streaking is reduced in two ways: 1. The fact that a very small percentage of gluten is included owing to a minimum quantity of wheat flour being used. 2. The high percentage of gelatinized starch in the special corn flour is effective in distributing this smaller gluten content thru the dough.

Moreover, due to the fact that our flour is less sticky, we eliminate to a considerable extent the possibility of dough accumulations in the different mechanical devices used in handling the dough—a condition which is present when wheat flour is used for dusting and which results frequently in stoppages and losses due to the accumulation of doughs and the loss of power and labor.

Ordinarily we prefer to use from seventy-five to eighty per cent of the corn flour and from twenty-five to twenty per cent of the wheat flour; but the corn flour content might possibly be reduced to fifty per cent and the wheat flour content might possibly be reduced to ten per cent. Of course, if desired, other kinds of flour may be mixed with our improved dusting flour serving, as it were, to dilute the same.

Other materials are sometimes used for dusting purposes. Ordinary corn flour, because of its nature, does not distribute as freely and does not exhibit economy in the quantity used because of the fact that it is not a high absorption product, and being ungelatinized, has a tendency to show white streaks in the bread, and cloudiness on the crust. Similar objections can be made to rice flour.

We claim:

1. A dusting flour composed of a flour made of a corn product at least partially gelatinized, mixed with a lesser amount of wheat flour.

2. A dusting flour composed of about three parts of flour made of a corn product at least partially gelatinized, and about one part of wheat flour.

In testimony whereof, we sign this specification.

JEFFREY R. SHORT.
MONTAGUE F. HUNT.

Certificate of Correction.

It is hereby certified that the assignee in Letters Patent No. 1,499,080, granted June 24, 1924, upon the application of Jeffrey R. Short, of La Grange, and Montague F. Hunt, of Chicago, Illinois, for an improvement in " Dusting Flour," was erroneously described and specified as "Andrews Milling Company," whereas said assignee should have been described and specified as *J. R. Short Milling Company*, as shown by the records of assignments in this office; and that the said Letters Patent should be read with this correction therein that the same may conform to the record of the case in the Patent Office.

Signed and sealed this 23d day of December, A. D. 1924.

[SEAL.]
KARL FENNING,
*Acting Commissioner of Patents.*